US005239491A

United States Patent [19]

Mucciacciaro

[11] Patent Number: 5,239,491

[45] Date of Patent: Aug. 24, 1993

[54] MEDICATION REMINDER WITH PILL CONTAINERS HOLDER AND CONTAINER SENSING AND WARNING MEANS

[76] Inventor: Domenic Mucciacciaro, 10715 Eureka St., Boca Raton, Fla. 33428

[21] Appl. No.: 743,928

[22] Filed: Aug. 12, 1991

[51] Int. Cl.$^5$ .......................... G04F 1/00; G06F 15/42

[52] U.S. Cl. .................................... 364/569; 364/479; 221/2; 221/15; 368/10

[58] Field of Search .................. 364/569, 479; 368/10, 368/251; 221/2, 15; 434/259

[56] References Cited

U.S. PATENT DOCUMENTS

| | | | |
|---|---|---|---|
| 3,496,652 | 2/1970 | Wolfner et al. | 434/259 |
| 4,223,801 | 9/1980 | Carlson | 221/3 |
| 4,258,354 | 3/1981 | Carmon et al. | 340/309.4 |
| 4,275,384 | 6/1981 | Hicks et al. | 340/309.4 |
| 4,382,628 | 5/1983 | Machamer | 368/10 |
| 4,588,303 | 5/1986 | Wirtschafter et al. | 368/10 |
| 4,609,356 | 9/1986 | Gilden et al. | 434/259 |
| 4,617,557 | 10/1986 | Gordon | 340/568 |
| 4,626,105 | 12/1986 | Miller | 368/10 |
| 4,660,991 | 4/1987 | Simon | 368/10 |
| 4,731,765 | 3/1988 | Cole et al. | 368/10 |
| 4,768,176 | 8/1988 | Kehr et al. | 368/10 |
| 4,768,177 | 8/1988 | Kehr et al. | 368/10 |
| 4,858,207 | 8/1989 | Buchner | 368/10 |
| 4,905,213 | 2/1990 | Masse et al. | 368/10 |
| 4,939,705 | 7/1990 | Hamilton et al. | 368/10 |
| 4,970,669 | 11/1990 | McIntosh et al. | 364/569 |
| 5,088,056 | 2/1992 | McIntosh et al. | 364/569 |
| 5,099,463 | 3/1992 | Lloyd et al. | 368/10 |
| 5,126,957 | 6/1992 | Kaufman et al. | 364/479 |

*Primary Examiner*—Jack B. Harvey
*Assistant Examiner*—Brian M. Buroker
*Attorney, Agent, or Firm*—Alvin S. Blum

[57] ABSTRACT

A device has a plurality of recesses for holding a plurality of medication containers, each fitting into a unique recess. The geometry of the bottom of each medication container is unique and only matches one recess in the holder. A sensor in each recess signals the presence or absence of the dedicated container to a microprocessor. The microprocessor is programmed with the prescribed dose administration schedule for each of the different medications in the different containers. A real time clock cooperates with the microprocessor and the program to signal audibly and visibly by a light at the appropriate container when a particular pill is to be administered. The signals stop when the appropriate container is removed from its recess. A different, warning sound indicates when the wrong container is lifted. Since only one particular container will fit into the programmed recess location, errors in medication administration are prevented.

9 Claims, 3 Drawing Sheets

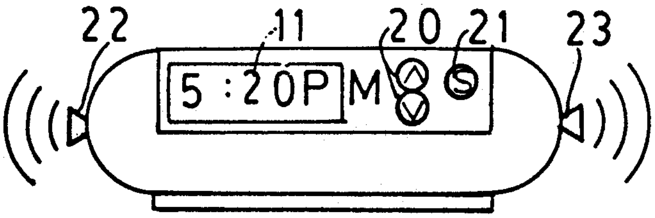
FIG. 2
FIG. 1
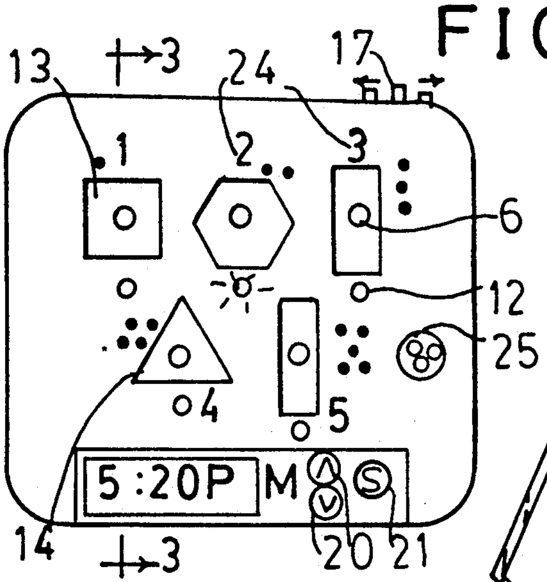
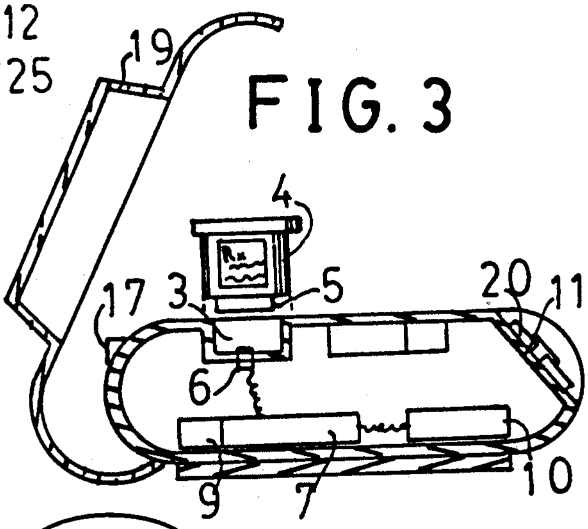
FIG. 3
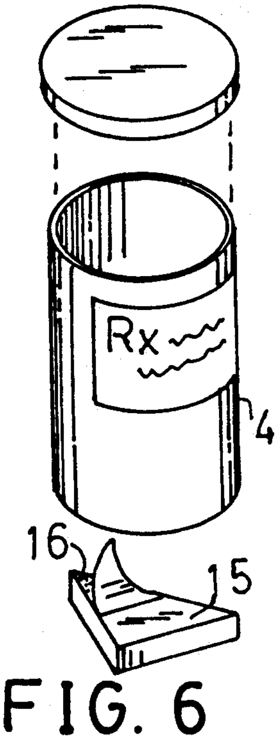
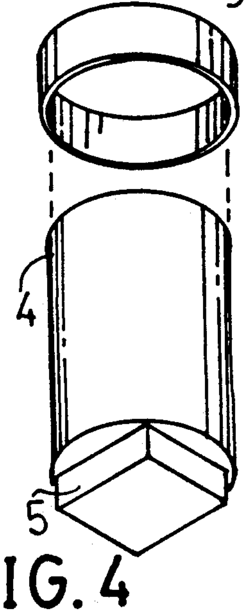
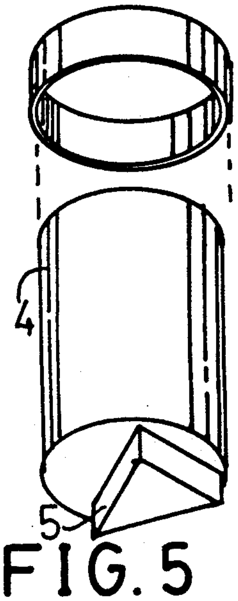
FIG. 6 FIG. 4 FIG. 5

MEDICATION REMINDER WITH PILL CONTAINERS HOLDER AND CONTAINER SENSING AND WARNING MEANS

BACKGROUND OF THE INVENTION

The present invention relates to medication storage devices that remind the user to take medication and more particularly, to such devices that store a plurality of containers for different medications with timed reminder mechanisms that indicate which medication container is to be accessed at prescribed times to meet a prescribed medication schedule.

The current trend in medicine is for physicians to prescribe more powerful medication and for the patient to be instructed to take many different kinds of medication at different times throughout the day. This is confusing and awkward for even the most alert patient. Elderly patients have memory problems and even younger patients may be forgetful, especially under the influence of the medicine. There may be dangers to the patient from: forgetting pills; taking extra pills; or taking pills at the wrong time. This is especially important with more powerful medications where the effective dose is close to the toxic dose, such as the cardiac glycosides, where a high blood level is necessary to control heart function but a little higher dose may be fatal.

SUMMARY OF THE INVENTION

It is, accordingly, an object of the invention to provide a compact, portable holder that can hold a number of different pills, capsules and the like, each in its own separate, closeable, labelled container to meet the legal requirements for labelled containers of medicines. It is another object that the holder provide programmable signalling means to remind the user to take each particular medication at scheduled times and to ensure compliance. It is yet another object of the invention to provide means for warning of an unscheduled dose or a repeat dose.

The pill container holder of the invention comprises means for holding a plurality of individual pill containers, each one in its own identifiable location within the holder. An electronic mechanism includes programming means for recording therein a medication administration schedule of which container of pills is to be accessed at particular times. The mechanism then will provide visible and audible reminder signals to the user at those scheduled times and also indicate which container or containers are to be accessed to take the correct medication at the correct times. Alternate audible and visible signals warn if the wrong container is picked up. The mechanism uses the removal and replacement of a container in the holder as indication that the medication in that particular container has been administered. The device includes a time clock.

These and other objects, advantages and features of the invention will become more apparent when the detailed description is read in conjunction with the appended drawings.

BRIEF DESCRIPTION OF THE DRAWINGS

FIG. 1 is a top view of the holder of the invention.

FIG. 2 is a front elevation view of the invention.

FIG. 3 is a sectional view taken on line 3—3 of FIG. 1 with optional hinged cover.

FIG. 4 is a perspective view of a pill container of the invention with a square bottom.

FIG. 5 is a perspective view of a pill container of the invention with a triangular bottom.

FIG. 6 is a perspective view of a conventional pill container with attachable triangular bottom.

DETAILED DESCRIPTION OF PREFERRED EMBODIMENT

Figure 7:
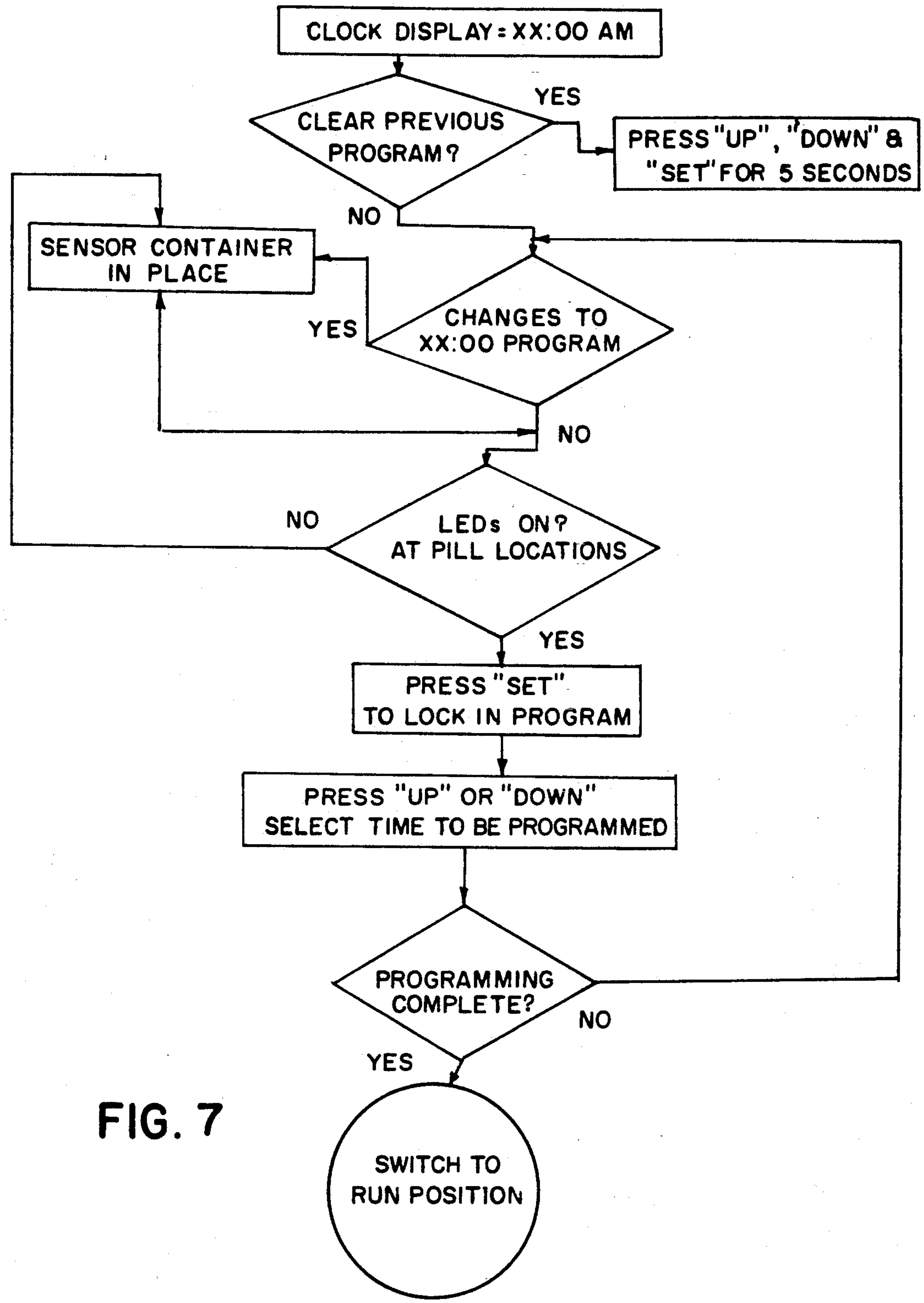
FIG. 7 illustrates a flow chart of the preferred form for programming the microprocessor used with the invention.

Referring now first to FIGS. 1-3, a reminder pill container holder 1 has a top surface 2 with uniquely shaped recesses 3 therein to receive pill containers 4 that have correspondingly shaped bottom portions 5. The shape of the upper portion may vary as desired. The bottle may be filled, labelled and capped by the pharmacy in the usual manner to comply with regulations, however only one unique bottom shape is reserved for a particular medication, and that is the only container that will fit into a dedicated recess 3 so that a particular location on the holder indicates a particular medication. A switch is located within each recess in such a manner that it will be actuated whenever a container is within the recess. Each switch 6 is wired to the microprocessor so that the system can be informed of which container has been removed from or inserted into its recess. A clock 9 is included in the microprocessor system, with the digital time display 11, electric power 10, and a light emitting diode 12 at each container recess 3.

As best seen in FIGS. 4 and 5, the pill containers 4 may be molded with a uniquely shaped bottom portion 5 so that the square shape of the container of FIG. 4 only fits into the square recess 13 and the triangular shape of the container of FIG. 5 only fits into the triangular recess 14 of the holder of FIG. 1. The system may be used with conventional pill containers by applying to the bottom thereof a uniquely shaped separate bottom portion 15 with pressure sensitive adhesive 16, as shown in FIG. 6. An optional hinged cover 19 may be provided for portability.

At the rear of the holder is a three position switch 17. In a first, set-time position, the time clock display 11 may be adjusted to real time with the up and down buttons 20. In a third, program position of switch 17, the microprocessor is instructed or programmed to follow the prescribed medication program as shown diagrammatically in FIG. 7. To obliterate the old program, up and down switches 20 and "set" switch 21 are all depressed simultaneously for five seconds.

PROGRAMMING MEDICATION SCHEDULE

The clock is set with up down buttons 20 to the first scheduled time of day for administration. The container of each type of medication that is to be administered at that time is inserted into its recess while all other containers are out of their recesses. The set switch 21 is pressed. Then the clock is set to the next scheduled time of day for administration. The container of each type of medication that is to be administered at that time is inserted into its recess while all other containers are out of their recesses. Then the set switch 21 is pressed. This process is repeated until all scheduled administration times have been programmed. Then the three position switch 17 is set to the central or "run" position, and all pill containers are inserted in their recesses.

OPERATION OF THE REMINDER MECHANISM

Figure 8:
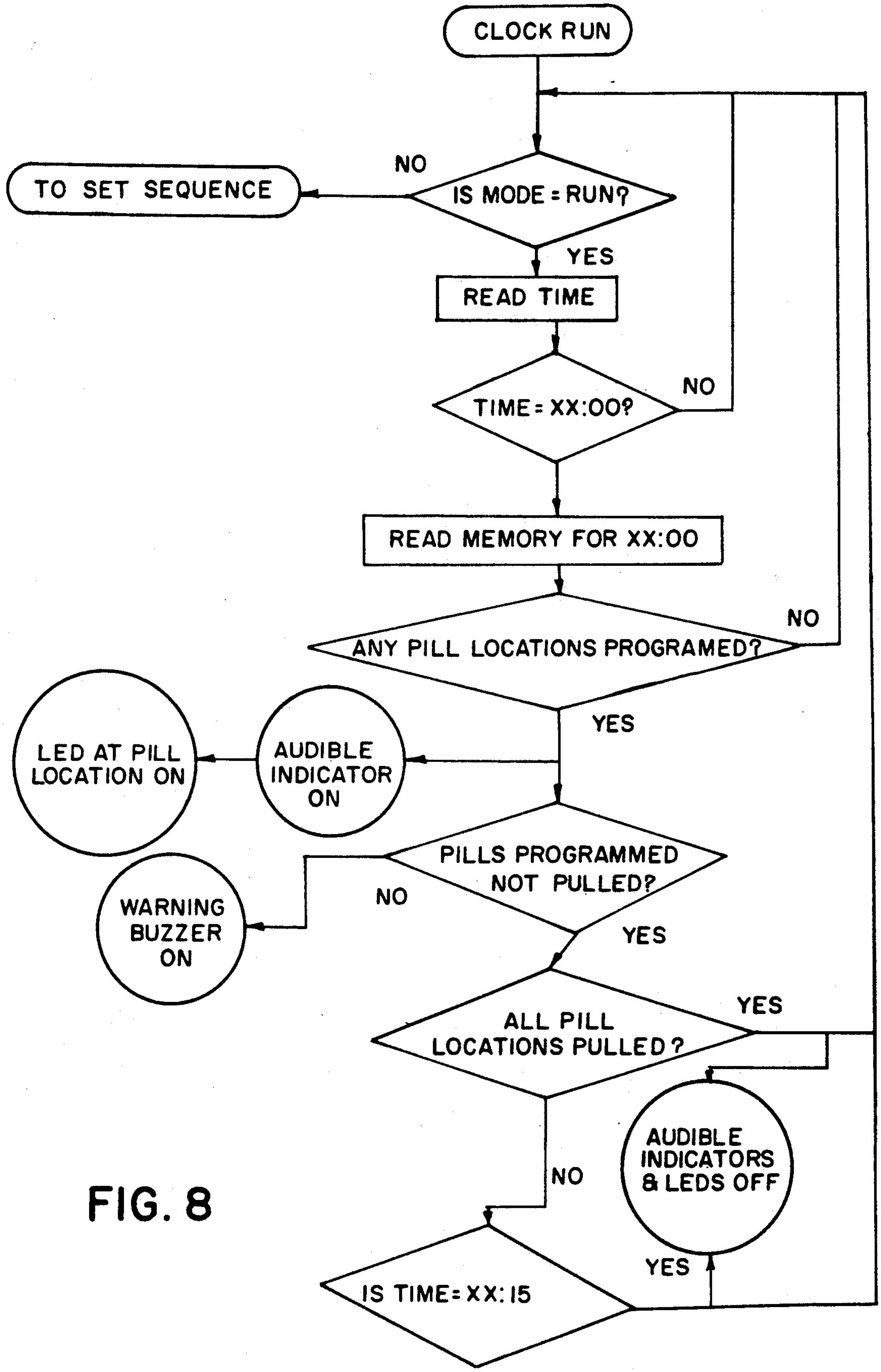
FIG. 8 illustrates a flowchart of the operating program for the microprocessing.

The device will normally be in the "run" mode, whose microprocessor operation is illustrated diagrammatically by the flowchart of FIG. 8. The real time is displayed on digital display 11. This time is compared with the preset or programmed time until there is a match. At that time a light 12 goes on at each of the container positions that have been scheduled for that time. Also a first audible signal 22 is sounded to remind the user that it is time to take the pills from the container or containers at the lights. When the container is lifted from the recess, the switch 6 in the recess is released. When all of the indicated containers have been lifted, the lights 12 are extinguished and the audible signal 22 is silenced. If an incorrect container is lifted from its recess by mistake, the associated switch 6 is released. This signals the microprocessor and second audible signal 23 sounds a warning signal easily distinguished from the first audible signal 22.

To conserve power, the audible and visible signals may optionally shut off after a preset time interval.

The recesses may be identified by numbers 24 imprinted nearby. For the visually impaired, the audible signal means may include verbal instructions such as: "take pill number three now". Adjacent recess number three may be three raised dots. For the hearing impaired, the audible signal may be supplemented by a vibrator, and the holder carried in a pocket or on a necklace.

Optionally, the microprocessor 7 may have means for storing a record of when each container is lifted from its recess. This can be used as a record of compliance with the prescribed medication administration schedule. A connector 25 may be provided for cable connection to a conventional computer for downloading and display of the compliance record on the computer. The computer may also store prescribed medication schedules and communicate that program to the container holder of the invention via the connector 25.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. A reminding medication containers holder comprising:

a) a holder body;

b) a plurality of individual medication containers, each of said containers being provided with a unique bottom portion, the bottom portion of each container having a different geometry than that of any of the other containers;

c) a plurality of open-topped compartments supported at discrete, fixed locations on said holder body, each of said compartments having a unique geometry matching the geometry of the bottom portion of only one of the containers, whereby each of the containers will fit in only one location on said holder;

d) a plurality of container-presence sensing means, each of said sensing means associated with a particular compartment, whereby the presence and absence of a particular container in a particular compartment is indicated by an electrically detectable condition thereof;

e) a clock generator for generating real time signals;

f) a time display;

g) a plurality of medication administration signal means for alerting a user to lift a particular designated container from the compartment associated therewith for administering the medication contained therein;

h) a programmable processor and memory means for activating particular medication administration signal means based on said real time signals in combination with a programmed medication administration schedule detailing which particular medication container is to be accessed at each particular time; and i) the plurality of container-presence sensing means being interconnected to said programmable processor and memory means whereby said signal means are inactivated when all containers designated at a scheduled time have been lifted from their associated compartments.

2. The holder according to claim 1 including warning means for warning a user when a container is lifted from the compartment associated therewith at an unscheduled time.

3. The holder according to claim 2, in which the signal means and warning means are selected from the group of signal and warning means consisting of audible and visible means.

4. The holder according to claim 2, further comprising recording means for storing and recording a record of which containers have been lifted and when they were lifted as a record associated with compliance with a programmed medication schedule.

5. The holder according to claim 1, in which said unique bottom portion is provided as a separate element arranged for attaching to the bottom of a medication container.

6. The holder according to claim 2, in which said unique bottom portion is provided as a separate element arranged for attaching to the bottom of a medication container.

7. The holder according to claim 4 including interconnecting means for communication between said recording means and a computer.

8. The holder according to claim 1, in which said container-presence sensing means are actuatable by the unique bottom portion of a container.

9. The holder according to claim 1, in which said medication administration schedule is programmed by inputting a particular time associated with a particular container while said container is inserted in the compartment associated therewith.

* * * * *